US012769707B2

(12) United States Patent
Shveidel et al.

(10) Patent No.: US 12,769,707 B2
(45) Date of Patent: Oct. 20, 2026

(54) MIXED METADATA UPDATE WITHOUT TRANSACTIONAL JOURNAL IN STORAGE SYSTEM WITH METADATA DELTA LOG AND LOG STRUCTURED METADATA

(71) Applicant: Dell Products L.P., Round Rock, TX (US)

(72) Inventors: Vladimir Shveidel, Pardes Hana-Karkur (IL); Dror Zalstein, Givatayim (IL); Nimrod Shani, Raanana (IL)

(73) Assignee: Dell Products L.P., Round Rock, TX (US)

( * ) Notice: Subject to any disclaimer, the term of this patent is extended or adjusted under 35 U.S.C. 154(b) by 46 days.

(21) Appl. No.: 18/581,640

(22) Filed: Feb. 20, 2024

(65) Prior Publication Data

US 2025/0265230 A1 Aug. 21, 2025

(51) Int. Cl.
*G06F 16/174* (2019.01)
*G06F 16/176* (2019.01)
*G06F 16/178* (2019.01)

(52) U.S. Cl.
CPC ...... *G06F 16/1756* (2019.01); *G06F 16/1774* (2019.01); *G06F 16/178* (2019.01)

(58) Field of Classification Search
CPC . G06F 16/1756; G06F 16/1774; G06F 16/178
See application file for complete search history.

(56) References Cited

U.S. PATENT DOCUMENTS

| | | | | |
|---|---|---|---|---|
| 11,200,219 | B2 | 12/2021 | Shveidel et al. | |
| 11,237,771 | B1 | 2/2022 | Shveidel et al. | |
| 11,347,725 | B2 | 5/2022 | Shveidel et al. | |
| 11,436,142 | B1 | 9/2022 | Vankamamidi et al. | |
| 11,507,290 | B2 | 11/2022 | Dalmatov et al. | |
| 11,726,663 | B2 | 8/2023 | Shveidel et al. | |
| 11,755,544 | B1 | 9/2023 | Junqueira et al. | |
| 11,853,656 | B1 | 12/2023 | Naamad et al. | |
| 2011/0066808 | A1* | 3/2011 | Flynn | G06F 12/0246 711/E12.001 |
| 2021/0216531 | A1* | 7/2021 | Shveidel | G06F 16/2365 |
| 2022/0342825 | A1* | 10/2022 | Derzhavetz | G06F 9/30047 |
| 2023/0376228 | A1* | 11/2023 | Cariello | G06F 3/0655 |

* cited by examiner

*Primary Examiner* — Khanh B Pham
*Assistant Examiner* — Ranjit P Doraiswamy
(74) *Attorney, Agent, or Firm* — BainwoodHuang

(57) ABSTRACT

Techniques for handling mixed metadata (MD) updates using an MD delta log and log structured MD. The techniques include, while performing a transaction commit operation, writing, to an MD delta log, raw delta updates to MD pages, logical-to-physical address translation table (TT) updates for MD pages containing bulk updates, and specialized flags for the MD pages containing bulk updates. For each MD page containing bulk updates, raw delta updates, a TT update, and a specialized flag are written to the MD delta log in association with a transaction identifier. The techniques include generating an MD stream for the MD pages containing bulk updates, and passing the MD stream to an MD pages tier of a storage array. The techniques include, in response to a predetermined event, replaying the MD delta log to apply valid delta updates to at least one MD page containing bulk updates in the MD pages tier.

20 Claims, 5 Drawing Sheets

MIXED METADATA UPDATE WITHOUT TRANSACTIONAL JOURNAL IN STORAGE SYSTEM WITH METADATA DELTA LOG AND LOG STRUCTURED METADATA

BACKGROUND

Clustered storage systems employ various techniques and methodologies to protect and/or distribute electronic data, such as user data and metadata (MD). In response to receipt of a write input/output (IO) request ("write request") from a storage client computer ("storage client"), a storage processor ("storage node") of a clustered storage system logs pending changes to MD of a storage element (e.g., MD page) in a journal ("MD delta log") implemented in local memory. Once the pending changes to MD of the MD page have been logged in the MD delta log, the storage node sends an acknowledgement to the storage client that issued the write request. The storage node then stores the pending changes to MD of the MD page in a storage object (e.g., volume (VOL)) on a storage device (e.g., solid state drive (SSD)) of a storage array.

SUMMARY

In a clustered storage system, a storage node can write pending changes to MD ("delta updates") of a MD page to memory structures in volatile memory, and log the delta updates to the MD page in an MD delta log in persistent memory. The volatile memory structures and the MD delta log can be referred to collectively as the "delta log infrastructure." Upon determination that the delta log infrastructure is full or at any other suitable time, the storage node can perform a transaction commit operation to store the delta updates to the MD page in a VOL on an SSD of a storage array. To that end, the storage node can aggregate any delta updates that correspond to the same MD pages ("small updates"), and store them in the VOL in an amortized fashion. The storage node can also store entire MD pages containing delta updates ("bulk updates"), which themselves may be highly or completely amortized. Unfortunately, however, writing both small updates and bulk updates to the volatile memory structures and/or the MD delta log can overload the delta log infrastructure, significantly reducing the delta log infrastructure's efficiency.

Improved techniques are disclosed herein for handling mixed MD updates (e.g., small updates, bulk updates) in a storage node using a metadata (MD) delta log and log structured MD. The storage node can include a volatile memory, a persistent memory, and a logical-to-physical address translation table (TT), as well as a tiered storage array that includes an MD pages tier. The volatile memory can include volatile memory structures for storing and/or aggregating delta updates to MD pages. The TT can map a logical address space of the storage node to a physical address space of the MD pages tier, and can be used to track, within the MD pages tier, physical address locations of one or more MD pages containing bulk updates. The persistent memory can include an MD delta log for logging (i) all "raw" delta updates to MD pages, (ii) logical-to-physical address updates to the TT ("TT updates"), and (iii) a specialized "drop-delta" (DD) flag for each MD page containing bulk updates. The DD flag for each MD page containing bulk updates can provide an indication that all delta updates to the MD page that occurred before it was stored in the MD pages tier are no longer valid and should be dropped or discarded. For each MD page containing bulk updates, the MD delta log can maintain raw delta updates, a TT update, and a DD flag, atomically within the scope of a transaction.

The disclosed techniques can include, while performing a transaction commit operation, writing, to an MD delta log, raw delta updates to MD pages, TT updates for respective MD pages containing bulk updates, and DD flags for the respective MD pages containing bulk updates. For each MD page containing bulk updates, raw delta updates, a TT update, and a DD flag are written to the MD delta log in association with a unique transaction identifier. The disclosed techniques can include generating an MD stream for the MD pages containing bulk updates, and passing the MD stream to an MD pages tier of a tiered storage array. The disclosed techniques can include, in response to a predetermined event (e.g., high availability (HA) event, crash event), replaying the MD delta log to apply valid delta updates to at least one MD page containing bulk updates in the MD pages tier, thereby recovering the MD pages tier to a consistent state.

In certain embodiments, a method includes, during performance of a first transaction commit operation by a storage node, writing raw delta updates to MD pages to a metadata (MD) delta log. At least some of the raw delta updates can correspond to bulk updates to a first MD page. The method includes, for the first MD page containing bulk updates, writing, to the MD delta log, the bulk updates to the first MD page, and a logical-to-physical address translation table (TT) update for the first MD page, in association with a first unique transaction identifier (ID). The method includes generating an MD stream for at least the first MD page containing bulk updates, and passing the MD stream including at least the first MD page to an MD pages tier of a storage array. The first MD page is stored in the MD pages tier in accordance with the logical-to-physical address TT update for the first MD page. The method includes, in response to a predetermined event (e.g., high availability event (HA), crash event), replaying the MD delta log to apply valid delta updates written thereto to the first MD page stored in the MD pages tier, thereby recovering the MD pages tier to a consistent state.

In certain arrangements, the method includes, for the first MD page containing bulk updates, writing, to the MD delta log, the bulk updates to the first MD page, the logical-to-physical address TT update for the first MD page, and a first specialized flag for the first MD page, in association with the first unique transaction ID. The first specialized flag provides an indication that all delta updates to the first MD page that occurred prior to the first MD page being stored in the MD pages tier are to be dropped or discarded.

In certain arrangements, the method includes, during the performance of the first transaction commit operation by the storage node, acquiring a first exclusive lock for the first MD page containing bulk updates.

In certain arrangements, the method includes synchronizing at least the bulk updates to the first MD page, and the logical-to-physical address TT update for the first MD page, in association with the first unique transaction ID, in a volatile memory structure, and, in response to the synchronizing of the bulk updates to the first MD page, and the logical-to-physical address TT update for the first MD page, in the volatile memory structure, releasing the first exclusive lock for the first MD page containing bulk updates.

In certain arrangements, the method includes, during performance of a second transaction commit operation by the storage node, writing raw delta updates to MD pages to the MD delta log. At least some of the raw delta updates correspond to bulk updates to a second MD page. The method includes, for the second MD page containing bulk updates, writing, to the MD delta log, the bulk updates to the second MD page, and a logical-to-physical address TT update for the second MD page, in association with a second unique transaction ID.

In certain arrangements, the method includes, during the performance of the second transaction commit operation by the storage node, acquiring a second exclusive lock for the second MD page containing bulk updates.

In certain arrangements, the method includes synchronizing at least the bulk updates to the second MD page, and the logical-to-physical address TT update for the second MD page, in association with the second unique transaction ID, in a volatile memory structure, and, in response to the synchronizing of the bulk updates to the second MD page, and the logical-to-physical address TT update for the second MD page, in the volatile memory structure, releasing the second exclusive lock for the second MD page containing bulk updates.

In certain arrangements, the method includes generating the MD stream for the first MD page and the second MD page, and passing the MD stream including the first MD page and the second MD page to the MD pages tier. The first MD page is stored in the MD pages tier in accordance with the logical-to-physical address TT update for the first MD page, and the second MD page is stored in the MD pages tier in accordance with the logical-to-physical address TT update for the second MD page.

In certain arrangements, the method includes, for the second MD page containing bulk updates, writing, to the MD delta log, the bulk updates to the second MD page, the logical-to-physical address TT update for the second MD page, and a second specialized flag for the second MD page, in association with the second unique transaction ID. The second specialized flag provides an indication that all delta updates to the second MD page that occurred prior to the second MD page being stored in the MD pages tier are to be dropped or discarded.

In certain arrangements, the first MD page corresponds to a first version of a respective MD page containing bulk updates, and the second MD page corresponds to a second version of the respective MD page containing bulk updates. The method includes replaying the MD delta log to apply the valid delta updates written thereto to at least the first version of the respective MD page stored in the MD pages tier.

In certain embodiments, a system includes a memory, and processing circuitry configured to execute program instructions out of the memory, during performance of a first transaction commit operation, to write raw delta updates to MD pages to a metadata (MD) delta log. At least some of the raw delta updates correspond to bulk updates to a first MD page. The processing circuitry is configured to execute the program instructions out of the memory, for the first MD page containing bulk updates, to write, to the MD delta log, the bulk updates to the first MD page, and a logical-to-physical address translation table (TT) update for the first MD page, in association with a first unique transaction identifier (ID), to generate an MD stream for at least the first MD page containing bulk updates, and to pass the MD stream including at least the first MD page to an MD pages tier of a storage array. The first MD page is stored in the MD pages tier in accordance with the logical-to-physical address TT update for the first MD page. The processing circuitry is configured to execute the program instructions out of the memory, in response to a predetermined event (e.g., high availability (HA) event, crash event), to replay the MD delta log to apply valid delta updates written thereto to the first MD page stored in the MD pages tier, thereby recovering the MD pages tier to a consistent state.

In certain arrangements, the processing circuitry is configured to execute the program instructions out of the memory, for the first MD page containing bulk updates, to write, to the MD delta log, the bulk updates to the first MD page, the logical-to-physical address TT update for the first MD page, and a first specialized flag for the first MD page, in association with the first unique transaction ID. The first specialized flag provides an indication that all delta updates to the first MD page that occurred prior to the first MD page being stored in the MD pages tier are to be dropped or discarded.

In certain arrangements, the processing circuitry is configured to execute the program instructions out of the memory, during the performance of the first transaction commit operation, to acquire a first exclusive lock for the first MD page containing bulk updates.

In certain arrangements, the processing circuitry is configured to execute the program instructions out of the memory to synchronize at least the bulk updates to the first MD page, and the logical-to-physical address TT update for the first MD page, in association with the first unique transaction ID, in a volatile memory structure, and, in response to synchronizing the bulk updates to the first MD page, and the logical-to-physical address TT update for the first MD page, in the volatile memory structure, release the first exclusive lock for the first MD page containing bulk updates.

In certain arrangements, the processing circuitry is configured to execute the program instructions out of the memory, during performance of a second transaction commit operation, to write raw delta updates to MD pages to the MD delta log. At least some of the raw delta updates correspond to bulk updates to a second MD page. The processing circuitry is configured to execute the program instructions out of the memory, for the second MD page containing bulk updates, to write, to the MD delta log, the bulk updates to the second MD page, and a logical-to-physical address TT update for the second MD page, in association with a second unique transaction ID.

In certain arrangements, the processing circuitry is configured to execute the program instructions out of the memory, during the performance of the second transaction commit operation, to acquire a second exclusive lock for the second MD page containing bulk updates.

In certain arrangements, the processing circuitry is configured to execute the program instructions out of the memory to synchronize at least the bulk updates to the second MD page, and the logical-to-physical address TT update for the second MD page, in association with the second unique transaction ID, in a volatile memory structure, and, in response to synchronizing the bulk updates to the second MD page, and the logical-to-physical address TT update for the second MD page, in the volatile memory structure, release the second exclusive lock for the second MD page containing bulk updates.

In certain arrangements, the processing circuitry is configured to execute the program instructions out of the memory to generate the MD stream for the first MD page and the second MD page, and to pass the MD stream including the first MD page and the second MD page to the MD pages tier. The first MD page is stored in the MD pages tier in accordance with the logical-to-physical address TT update for the first MD page, and the second MD page is stored in the MD pages tier in accordance with the logical-to-physical address TT update for the second MD page.

In certain arrangements, the first MD page corresponds to a first version of a respective MD page containing bulk updates, and the second MD page corresponds to a second version of the respective MD page containing bulk updates. The processing circuitry is configured to execute the program instructions out of the memory to replay the MD delta log to apply the valid delta updates written thereto to at least the first version of the respective MD page stored in the MD pages tier.

In certain embodiments, a computer program product includes a set of non-transitory, computer-readable media having instructions that, when executed by processing circuitry of a storage node in a clustered system, cause the processing circuitry to perform a method including, during performance of a first transaction commit operation by the storage node, writing raw delta updates to MD pages to a metadata (MD) delta log. At least some of the raw delta updates correspond to bulk updates to a first MD page. The method includes, for the first MD page containing bulk updates, writing, to the MD delta log, the bulk updates to the first MD page, and a logical-to-physical address translation table (TT) update for the first MD page, in association with a first unique transaction identifier (ID), generating an MD stream for at least the first MD page containing bulk updates, and passing the MD stream including at least the first MD page to an MD pages tier of a storage array. The first MD page is stored in the MD pages tier in accordance with the logical-to-physical address TT update for the first MD page. The method includes, in response to a predetermined event (e.g., high availability (HA) event, crash event), replaying the MD delta log to apply valid delta updates written thereto to the first MD page stored in the MD pages tier, thereby recovering the MD pages tier to a consistent state.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 4 is a flow diagram of an exemplary method of handling mixed MD updates in a storage node using an MD delta log and log structured MD.

DETAILED DESCRIPTION

Improved techniques are disclosed herein for handling mixed metadata (MD) updates (e.g., small updates, bulk updates) in a storage node using an MD delta log and log structured MD. The disclosed techniques can include, while performing a transaction commit operation, writing, to an MD delta log, raw delta updates to MD pages, logical-to-physical address translation table (TT) updates for respective MD pages containing bulk updates, and specialized "drop-delta" (DD) flags for the respective MD pages containing bulk updates. For each MD page containing bulk updates, raw delta updates, a TT update, and a DD flag are written to the MD delta log in association with a unique transaction identifier. The disclosed techniques can include generating an MD stream for the MD pages containing bulk updates, and passing the MD stream to an MD pages tier of a tiered storage array. The disclosed techniques can include, in response to a predetermined event (e.g., high availability (HA) event, crash event), replaying the MD delta log to apply valid delta updates to at least one MD page containing bulk updates in the MD pages tier, thereby recovering the MD pages tier to a consistent state.

Figure 1:
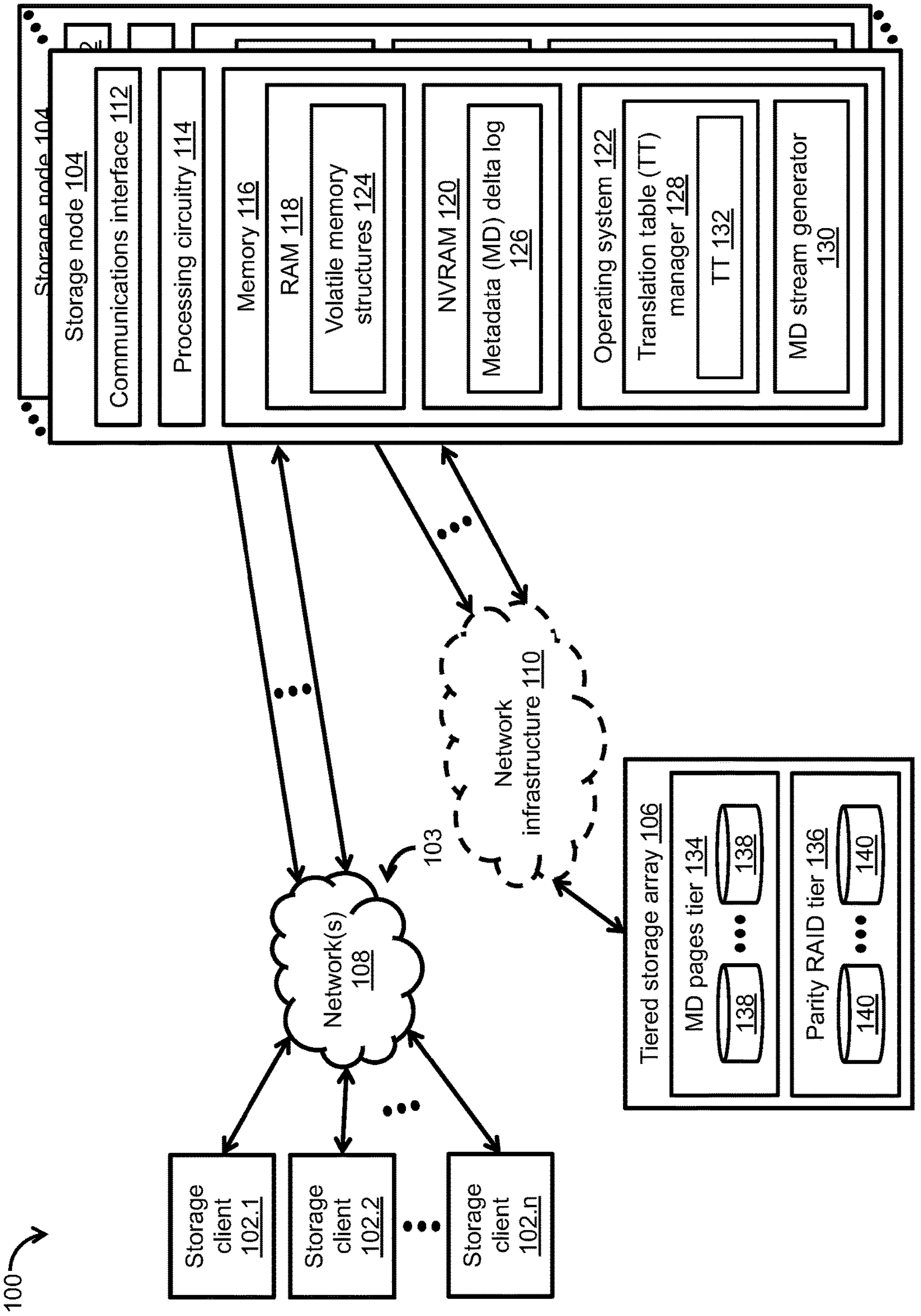
FIG. 1 is a block diagram of an exemplary storage environment, in which techniques can be practiced for handling mixed metadata (MD) updates (e.g., small updates, bulk updates) in a storage node using an MD delta log and log structured MD.

FIG. 1 depicts an illustrative embodiment of an exemplary storage environment 100, in which techniques can be practiced for handling mixed MD updates (e.g., small updates, bulk updates) in a storage node using an MD delta log and log structured MD. As shown in FIG. 1, the storage environment 100 can include a plurality of storage client computers ("storage clients") 102.1, 102.2, . . . , 102.*n*, a plurality of storage processors ("storage nodes") 104, and a tiered storage array 106, as well as a communications medium 103 that includes at least one network 108. Each storage client 102.1, . . . , 102.*n* can be configured to provide, over the network(s) 108, storage input/output (IO) requests (e.g., small computer system interface (SCSI) commands, network file system (NFS) commands) to a storage node 104. Such storage IO requests (e.g., write requests, read requests) can direct the storage node 104 to write and/or read user data and/or MD pages, blocks, files, or any other suitable storage elements to/from volumes (VOLs), virtual volumes (VVOLs) (e.g., VMware® VVOLs), logical units (LUs), filesystems, directories, or any other suitable storage objects maintained on storage devices (e.g., hard disk drives (HDDs), solid state drives (SSDs), flash drives) in the tiered storage array 106.

The communications medium 103 can be configured to interconnect the plurality of storage clients 102.1, . . . , 102.*n* with the storage node 104 to enable them to communicate and exchange user data, MD, and/or control signaling. As shown in FIG. 1, the communications medium 103 can be illustrated as a "cloud" to represent different network topologies, such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based communications devices and cabling, fiber optic devices and cabling, wireless devices, and so on, or any suitable combination thereof.

The storage node 104 can be communicably connected directly to the tiered storage array 106, or through an optional network infrastructure 110, which can include an Ethernet (e.g., layer 2 or layer 3) network, an InfiniBand network, a fiber channel network, and/or any other suitable network. As shown in FIG. 1, the storage node 104 can include a communications interface 112, processing circuitry 114, and a memory 116. The communications interface 112 can include an Ethernet interface, an InfiniBand interface, a fiber channel interface, or any other suitable communications interface. The communications interface

112 can further include SCSI target adapters, network interface adapters, or any other suitable adapters for converting electronic, optical, or wireless signals received over the network(s) 108 to a form suitable for use by the processing circuitry 114. The processing circuitry 114 (e.g., central processing unit (CPU)) can include a set of processing cores (e.g., CPU cores) configured to execute specialized code and data as program instructions out of the memory 116, process storage IO requests (e.g., write requests, read requests) issued by the storage clients 102.1, . . . , 102.*n*, and store user data and/or MD to the storage devices in the tiered storage array 106 within the storage environment 100, which can be a redundant array of independent disks (RAID) environment. In one embodiment, the tiered storage array 106 can include an MD pages tier 134 (e.g., a "fast" tier) containing a plurality of SSDs 138, and a parity RAID tier 136 (e.g., a "slow" tier) containing a plurality of HDDs 140.

The memory 116 can include volatile memory 118, such as a random access memory (RAM) or any other suitable volatile memory, and nonvolatile memory 120, such as a nonvolatile RAM (NVRAM), nonvolatile dual in-line memory module (NVDIMM), SSD, or any other suitable nonvolatile memory. As shown in FIG. 1, the RAM 118 can include volatile memory structures 124, and the NVRAM 120 can include an MD delta log 126. In one embodiment, the volatile memory structures 124 can store, at least temporarily, transaction records of MD specified by write requests issued by the storage clients 102.1, . . . , 102.*n*. Further, the MD delta log 126 can store and persist, at least temporarily, MD specified by such write requests, which can be de-staged, flushed, passed, or otherwise transferred (e.g., in the background) to storage objects (e.g., VOLs) maintained on storage devices (e.g., SSDs) of the MD pages tier 134, as well as maintained on storage devices (e.g., HDDs) of the parity RAID tier 136. The memory 116 can accommodate an operating system (OS) 122, such as a Linux OS, Unix OS, Windows OS, or any other suitable OS, as well as specialized software modules including a logical-to-physical address translation table (TT) manager 128 for managing updates to a TT 132 ("TT updates"), and an MD stream generator 130 for generating MD streams of MD pages containing bulk updates.

In the context of the processing circuitry 114 being implemented by a set of CPU cores executing specialized code and data as program instructions out of the memory 116, a computer program product can be configured to deliver all or a portion of the specialized code and data to the respective CPU cores. Such a computer program product can include one or more non-transient computer-readable storage media, such as a magnetic disk, magnetic tape, compact disk (CD), digital versatile disk (DVD), optical disk, flash drive, SSD, secure digital (SD) chip or device, application specific integrated circuit (ASIC), field programmable gate array (FPGA), and so on. Further, the non-transient computer-readable storage media can be encoded with sets of program instructions for performing, when executed by the respective CPU cores, the various techniques and/or methods disclosed herein.

Figure 2:
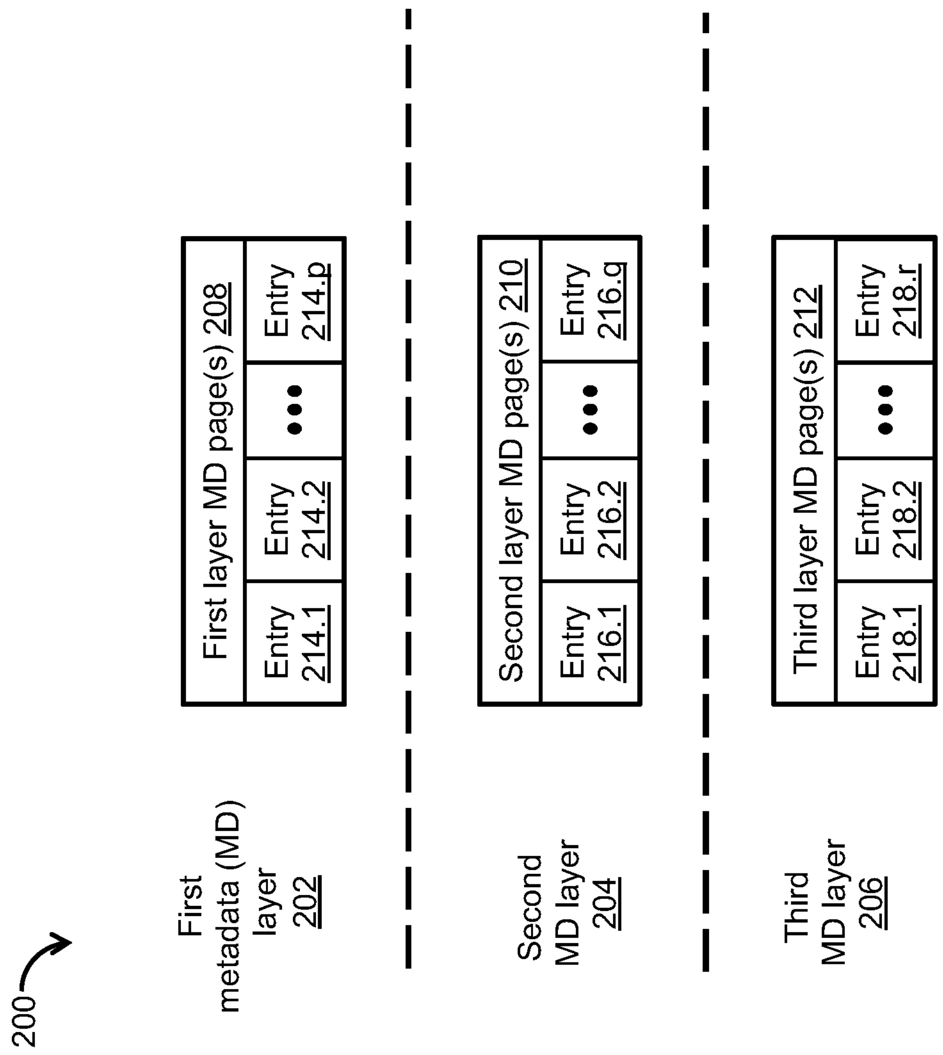
FIG. 2 is a block diagram of exemplary logical layers of MD pages, which can be maintained by a storage node in the storage environment of FIG. 1.

FIG. 2 depicts exemplary logical layers 200 of MD pages, which can be maintained by the storage node 104 in the storage environment 100 of FIG. 1. It is noted that any other suitable logical layer structure can be maintained by the storage node 104, using the techniques and/or methods disclosed herein. As shown in FIG. 2, the logical layers 200 can include a first MD layer 202, a second MD layer 204, and a third MD layer 206. The first MD layer 202 can include at least one first layer MD page 208. Further, the second MD layer 204 can include at least one second layer MD page 210, and the third MD layer 206 can include at least one third layer MD page 212. It is noted that the first MD layer 202, the second MD layer 204, and the third MD layer 206 are depicted in FIG. 2 as containing MD "pages" for purposes of illustration, and that any other suitable storage elements may be employed.

As shown in FIG. 2, the first layer MD page 208 can include a plurality of entries 214.1, 214.2, . . . , 214.*p*. Further, the second layer MD page 210 can include a plurality of entries 216.1, 216.2, . . . , 216.*q*, and the third layer MD page 212 can include a plurality of entries 218.1, 218.2, . . . , 218.*r*. The plurality of entries 214.1, 214.2, . . . , 214.*p* included in the first layer MD page 208 can map and/or point to at least some of the plurality of entries 216.1, 216.2, . . . , 216.*q* of the second layer MD page 210. For example, the first MD layer 202 may represent various ranges of logical block addresses (LBAs), and each of the plurality of entries 214.1, 214.2, . . . , 214.*p* of the first layer MD page 208 may be associated with a particular LBA range. In one embodiment, the first MD layer 202 can be organized as a "tree" data structure (e.g., b-tree), in which each "leaf" of the tree corresponds to a particular LBA range. As a result, the first layer MD page 208 can maintain a particular LBA mapping to the second layer MD page 210.

The plurality of entries 216.1, 216.2, . . . , 216.*q* included in the second layer MD page 210 can map and/or point to at least some of the plurality of entries 218.1, 218.2, . . . , 218.*r* of the third layer MD page(s) 212. In one embodiment, the second MD layer 204 can be configured to isolate logical address locations of MD pages in the first MD layer 202 from actual physical address locations of the MD pages. As such, the second layer MD page 210 can encapsulate a physical address location of an MD page to allow for its relocation without having to update the first layer MD page 208. In this way, the second MD layer 204 can decouple the LBA space from the physical address space.

The plurality of entries 218.1, 218.2, . . . , 218.*q* included in the third layer MD page 212 can store MD pages. For example, the third MD layer 206 may describe actual physical address locations of the MD pages in the tiered storage array 106. In one embodiment, each third layer MD page (e.g., the third layer MD page 212) can correspond to an MD page having a specified amount of storage capacity (e.g., 4 kilobytes (KB), 8 KB), such as an MD page containing bulk updates. Such MD pages, which may be highly or completely amortized, can be stored in the MD pages tier 134 in the tiered storage array 106, using the techniques and/or methods described herein.

During operation, the storage node 104 can use the volatile memory structures 124 to store and/or aggregate delta updates to MD pages. Further, the storage node 104 can use the TT 132 to map a logical address space to the physical address space of the MD pages tier 134, and to track, within the MD pages tier 134, physical address locations of one or more MD pages containing bulk updates. In addition, the storage node 104 can use the MD delta log 126 to log (i) all "raw" delta updates to MD pages, (ii) logical-to-physical address updates to the TT 132 ("TT updates"), and (iii) a specialized "drop-delta" (DD) flag for each MD page containing bulk updates. The DD flag for each MD page containing bulk updates can provide an indication that all delta updates to the MD page that occurred before it was stored in the MD pages tier 134 are no longer valid and should be dropped or discarded. For each MD page containing bulk updates, the MD delta log 126 can maintain raw delta updates, a TT update, and a DD flag, atomically within the scope of a transaction.

While performing a transaction commit operation, the storage node 104 can write, to the MD delta log 126, raw delta updates to MD pages, TT updates for respective versions of MD pages containing bulk updates, and DD flags for the respective versions of MD pages containing bulk updates. For each MD page containing bulk updates, raw delta updates, a TT update, and a DD flag can be written to the MD delta log 126 in association with a unique transaction identifier (e.g., sequence identifier or "SeqId"). The storage node 104 can generate an MD stream for the MD pages containing bulk updates, and pass the MD stream to the MD pages tier 134 in the tiered storage array 106. The storage node 104, in response to a predetermined event (e.g., high availability (HA) event, crash event), can replay the MD delta log 126 to apply valid delta updates to at least one of the MD pages containing bulk updates in the MD pages tier 134, thereby recovering the MD pages tier 134 to a consistent state.

Figure 3:
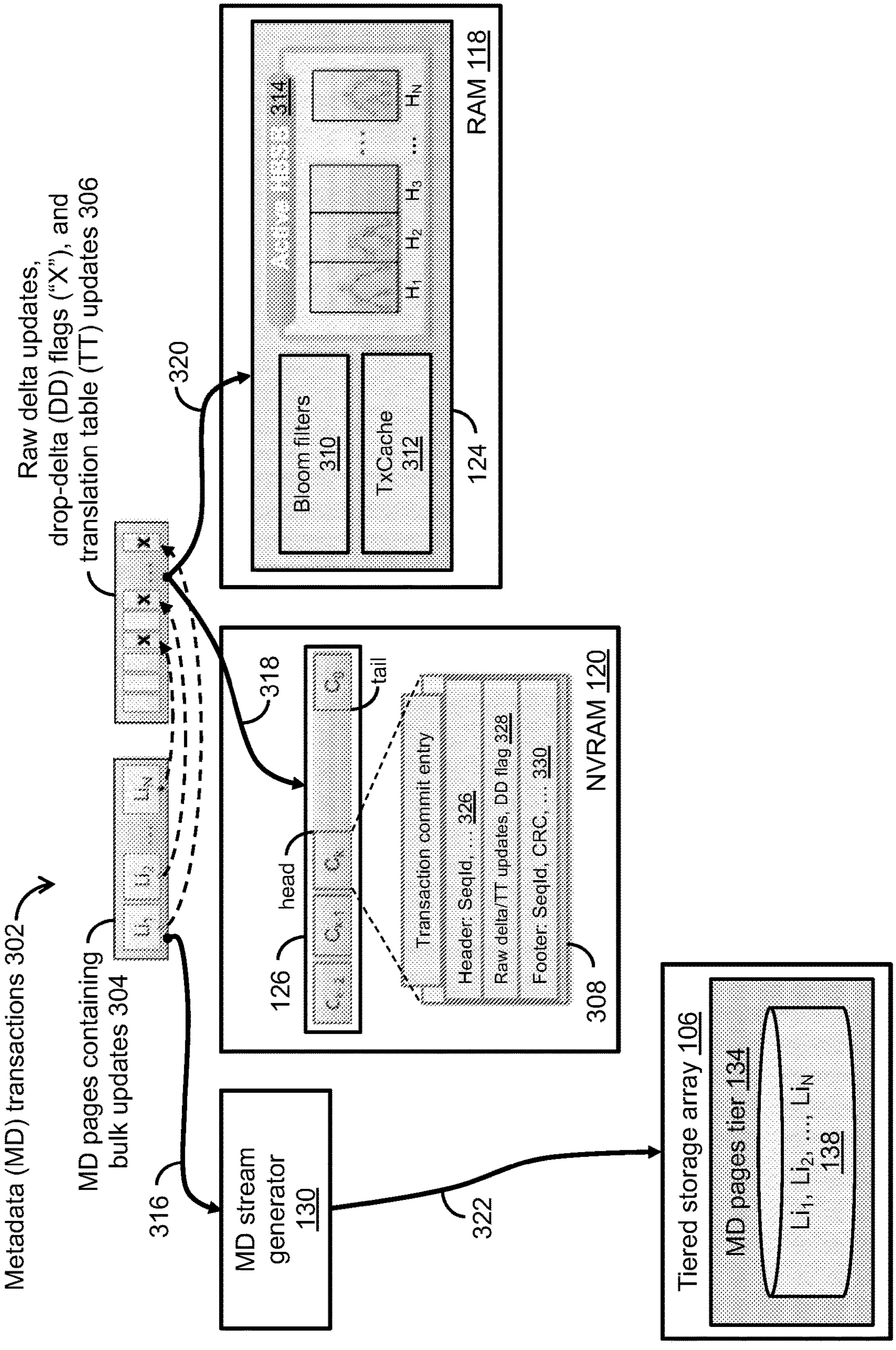
FIG. 3 is a block diagram of volatile memory components, persistent memory components, and MD storage components of the storage node of FIG. 2.

The disclosed techniques for handling mixed MD updates (e.g., small updates, bulk updates) in a storage node using an MD delta log and log structured MD will be further understood with reference to the following illustrative example and FIG. 3. FIG. 3 depicts several exemplary components of the storage node 104, namely, the RAM 118, the NVRAM 120, and the MD stream generator 130, as well as the tiered storage array 106 including the MD pages tier 134. As shown in FIG. 3, the RAM 118 can include the volatile memory structures 124, which can include a bloom filter 310, a transaction cache ("TxCache") 312, and a set of active hash-based sorted buckets (HBSBs) 314. The HBSBs 314 can include a set of data containers $H_1, H_2, H_3, \ldots, H_N$ for storing delta updates to MD pages. In one embodiment, each of the data containers $H_1, \ldots, H_N$ can be configured as a tree data structure (e.g., b-tree). The storage node 104 can use the bloom filter 310 to quickly determine whether or not delta updates for particular MD pages are contained in any of the data containers $H_1, \ldots, H_N$ of the HBSBs 314.

As shown in FIG. 3, the NVRAM 120 can include the MD delta log 126, which can store a plurality of transaction commit entries, $C_{k-2}$, $C_{k-1}$, $C_k$, $C_0$, each of which can include one or more raw delta updates, a TT update, and a DD flag (generally illustrated at reference numeral 328) within the scope of a transaction. In one embodiment, the MD delta log 126 can be configured as a ring buffer, in which transaction commit entries (e.g., $C_{k-2}$, $C_{k-1}$, $C_k$) can be added to the "head" of the ring buffer, and transaction commit entries (e.g., $C_0$) can be released from the "tail" of the ring buffer. Each of the transaction commit entries, $C_{k-2}$, $C_{k-1}$, $C_k$, $C_0$ (such as the transaction commit entry, $C_k$), can include a header 326 containing at least a transaction ID ("SeqId"), and a footer 330 containing at least the SeqId and a cyclic redundancy code or checksum ("CRC") value.

In this example, the storage node 104 performs transaction commit operations to commit, in respective MD transactions 302, MD pages 304 (e.g., $Li_1, Li_2, \ldots, Li_N$) containing bulk updates to storage in the MD pages tier 134. In this example, the MD pages, $Li_1$, $Li_2$, correspond to two versions, Ver. 1, Ver. 2, respectively, of the same MD page containing bulk updates. In a first transaction commit operation, the storage node 104 executes a first transaction commit thread to acquire an exclusive lock for the first version, $Li_1$ (Ver. 1), of the MD page, and to write or persist the transaction commit entry, $C_{k-2}$, to the MD delta log 126 (as illustrated by an arrow 318). In this example, the transaction commit entry, $C_{k-2}$, includes, for the first version, $Li_1$ (Ver. 1), of the MD page, one or more raw delta updates, a DD flag, X, and a TT update (generally illustrated at reference numeral 306). The storage node 104 further executes the first transaction commit thread to update the header of the transaction commit entry, $C_{k-2}$, to include a corresponding SeqId, and to update the footer of the transaction commit entry, $C_{k-2}$, to include the corresponding SeqId as well as a CRC value. It is noted that, while building an up-to-date MD page, e.g., during a cache miss or de-stage operation, the DD flag, X, can provide an indication that all delta updates that occurred before the writing of the MD page are no longer valid and should be dropped or discarded.

Figure 4:
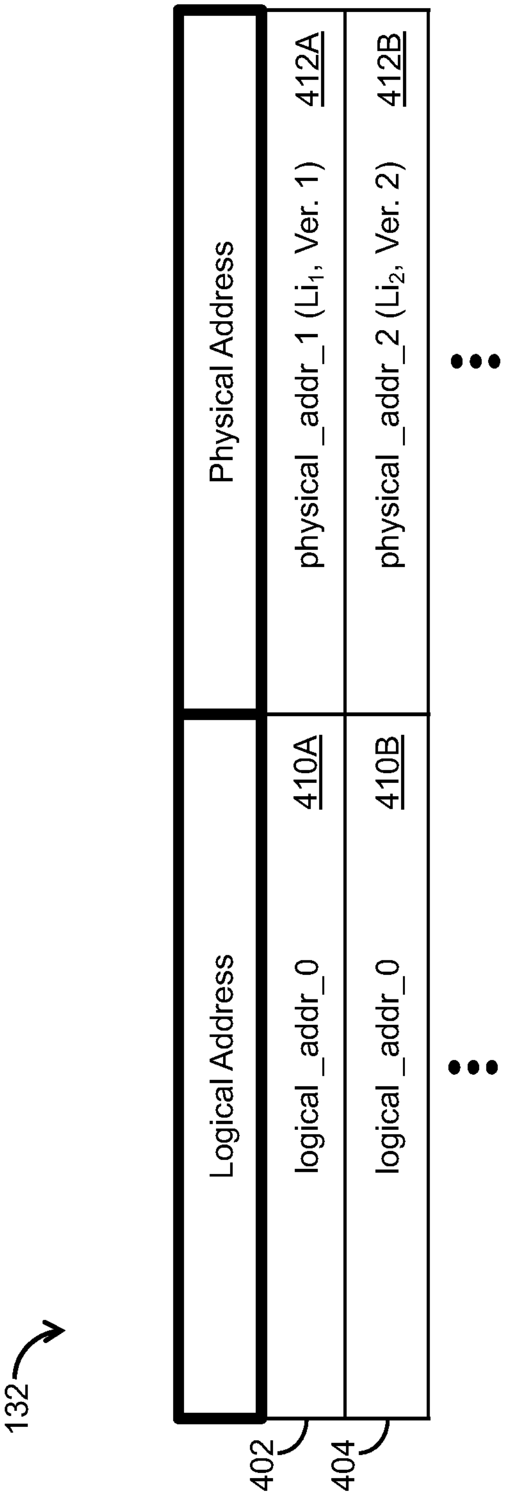
FIG. 4 is an exemplary logical-to-physical address translation table (TT) containing TT updates for several versions of MD pages containing bulk updates.

FIG. 4 depicts the logical-to-physical address translation table (TT) 132, which contains TT updates for at least the two versions, $Li_1$ (Ver. 1), $Li_2$ (Ver. 2), of the MD page containing bulk updates. As described herein, the storage node 104 can use the TT 132 to map a logical address space to the physical address space of the MD pages tier 134. As a result, MD pages in the physical address space of the MD pages tier 134 can be moved without having to update any logical address references associated with the MD pages. In this example, the storage node 104 uses the TT 132 to map a logical address, logical_addr_0 410A, to a physical address, physical_addr_1 412A, of the first version, $Li_1$ (Ver. 1), of the MD page containing bulk updates.

Having written or persisted the transaction commit entry, $C_{k-2}$, to the MD delta log 126, the storage node 104 executes the first transaction commit thread to update or synchronize, in the volatile memory structures 124 (as illustrated by an arrow 320), the raw delta updates, the TT update, and the DD flag, X, included in the transaction commit entry, $C_{k-2}$. In one embodiment, such updates can be converted into an MD update "tuple" including multiple tuple entries, such as (i) a logical index, Li, of a corresponding MD page, (ii) an offset, Ei, within the MD page, (iii) a record or delta type, T, defining the size of the update, and (iv) a payload or value, V, of the update. Further, the designations, $H_1$, $H_2$, and so on, of the data containers of the active HBSBs 314 can correspond to hash values, which can be obtained by applying a hash function to the logical indices, $Li_1$, $Li_2$, and so on, of the MD pages. In this way, the data container, $H_1$, of the HBSBs 314 can be associated with the first version, $Li_1$ (Ver. 1), of the MD page, based on the hash of the logical index, $Li_1$, of the MD page. Once the raw delta updates, the TT update, and the DD flag, X, included in the transaction commit entry, $C_{k-2}$, are updated or synchronized in the volatile memory structures 124, the exclusive lock for the first version, $Li_1$ (Ver. 1), of the MD page is released.

In this example, in a second transaction commit operation, the storage node 104 executes a second transaction commit thread to acquire an exclusive lock for the second (or subsequent) version, $Li_2$ (Ver. 2), of the MD page, and to write or persist the transaction commit entry, $C_{k-1}$, to the MD delta log 126 (as illustrated by an arrow 318). The transaction commit entry, $C_{k-1}$, includes, for the second version, $Li_2$ (Ver. 2), of the MD page, one or more raw delta updates, a DD flag, X, and a TT update (generally illustrated at reference numeral 306). The storage node 104 executes the second transaction commit thread to update the header of the transaction commit entry, $C_{k-1}$, to include a corresponding SeqId, and to update the footer of the transaction commit entry, $C_{k-1}$, to include the corresponding SeqId as well as a CRC value. Further, the storage node 104 uses the TT 132 to map a logical address, logical_addr_0 410B (see FIG. 4), to a physical address, physical_addr_1 412B (see FIG. 4), of the second version, $Li_2$ (Ver. 2), of the MD page containing bulk updates.

Having written or persisted the transaction commit entry, $C_{k-1}$, to the MD delta log 126, the storage node 104 executes the second transaction commit thread to update or synchronize, in the volatile memory structures 124 (as illustrated by an arrow 320), the raw delta updates, the TT update, and the DD flag, X, included in the transaction commit entry, $C_{k-1}$. As described herein with reference to the first transaction commit thread, such updates performed while executing the second transaction commit thread can be converted into an MD update "tuple" including multiple tuple entries (e.g., Li, Ei, T, V). Further, the designations, $H_1$, $H_2$, and so on, of the data containers of the HBSBs 314 can correspond to hash values, which can be obtained by applying a hash function to the logical indices, $Li_1$, $Li_2$, and so on, of the MD pages. In this way, the data container, $H_2$, of the HBSBs 314 can be associated with the second version, $Li_2$ (Ver. 2), of the MD page, based on the hash of the logical index, $Li_2$, of the MD page. Once the raw delta updates, the TT update, and the DD flag, X, included in the transaction commit entry, $C_{k-1}$, are updated or synchronized in the volatile memory structures 124, the exclusive lock for the second version, $Li_2$ (Ver. 2), of the MD page is released. It is noted that the storage node 104 can perform additional transaction commit operations, like the first and second transaction commit operations described herein, for each of the MD pages 304 (e.g., $Li_1$, $Li_2$, . . . , $Li_N$) containing bulk updates.

Having written or persisted the transaction commit entries, $C_{k-2}$, $C_{k-1}$, to the MD delta log 126, and updated or synchronized the raw delta updates, TT updates, and DD flags, X, included in the transaction commit entries, $C_{k-2}$, $C_{k-1}$, in the volatile memory structures 124, the storage node 104 uses the MD stream generator 130 to generate an MD stream containing at least the first version, $Li_1$ (Ver. 1), of the MD page, and the second version, $Li_2$ (Ver. 2), of the MD page. In one embodiment, the MD stream generator 130 stores multiple versions of MD pages containing bulk updates (e.g., $Li_1$ (Ver. 1), $Li_2$ (Ver. 2), and so on) in a contiguous chunk of MD (e.g., 2 megabyte (MB)), which is referred to herein as a "stripe" (e.g., RAID stripe) or "physical large block" (PLB). Once the PLB (e.g., 2 MB chunk) is full, the MD stream generator 130 passes it in the MD stream to the MD pages tier 134 (as illustrated by an arrow 322) for storage on the SSD 138 (see FIG. 3), in accordance with the TT updates. Because the MD stream containing at least the first and second versions, $Li_1$ (Ver. 1), $Li_2$ (Ver. 2), of the MD page is passed in the MD stream to the MD pages tier 134, while bypassing the volatile memory structures 124 and the MD delta log 126, unwanted overloading of the delta log infrastructure can be avoided, thereby increasing the delta log infrastructure's efficiency.

It is noted that a version history of the MD pages (e.g., $Li_1$ (Ver. 1), $Li_2$ (Ver. 2)) can be stored to the MD pages tier 134, and/or one or more of the MD pages (e.g., $Li_1$ (Ver. 1), $Li_2$ (Ver. 2)) can be stored ("de-staged") to the parity RAID tier 136. It is further noted that the storage node 104, in response to a predetermined event (e.g., high availability (HA) event, crash event), can replay the MD delta log 126 to apply valid delta updates to at least the first version, $Li_1$ (Ver. 1), of the MD page stored to the MD pages tier 134, thereby recovering at least the most recent second version, $Li_2$ (Ver. 2), of the MD page.

Figure 5:
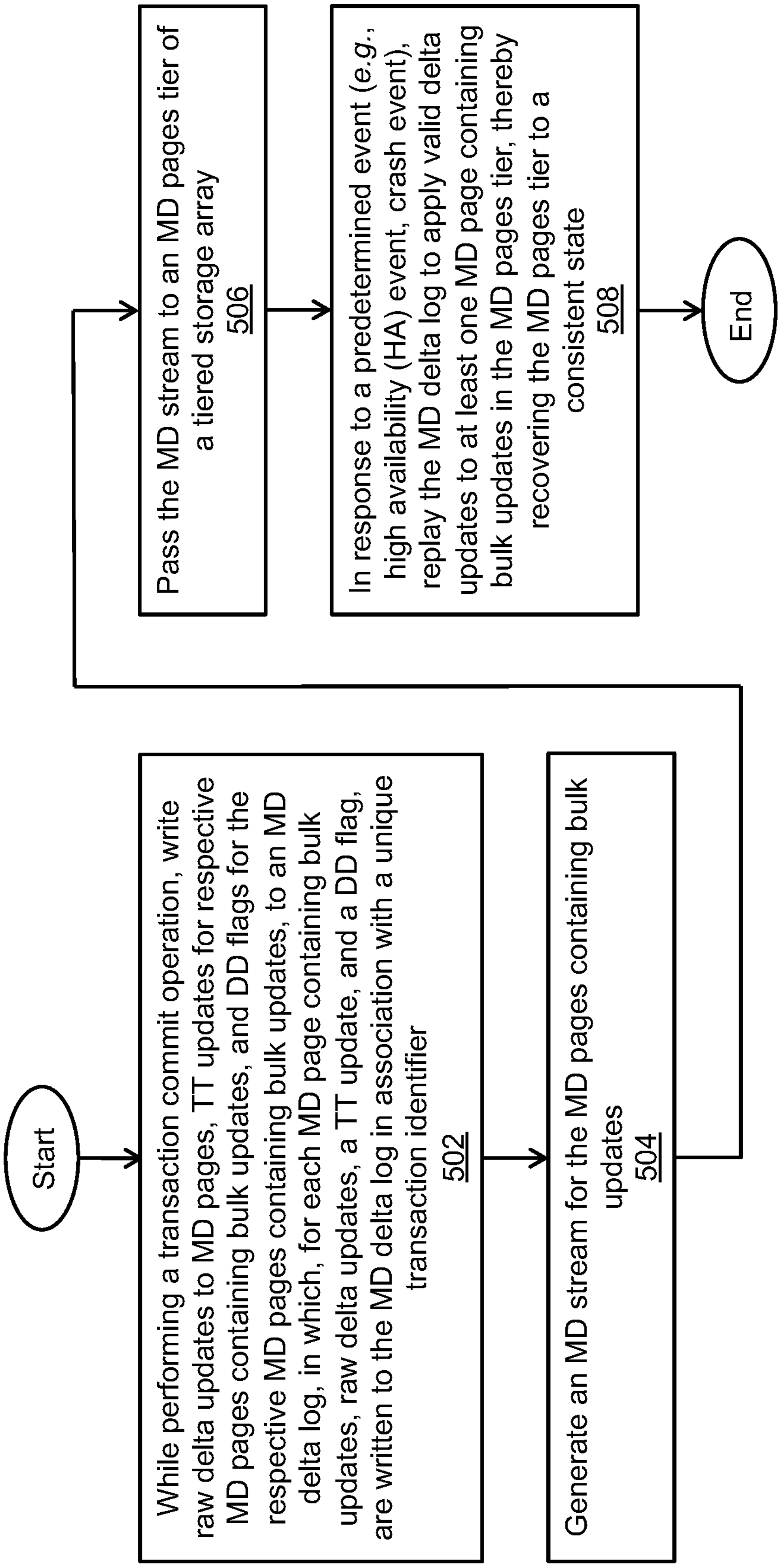

An exemplary method of handling mixed MD updates in a storage node using an MD delta log and log structured MD is described below with reference to FIG. 5. As depicted in block 502, while performing a transaction commit operation, raw delta updates to MD pages, TT updates for respective MD pages containing bulk updates, and DD flags for the respective MD pages containing bulk updates, are written to an MD delta log, in which, for each MD page containing bulk updates, raw delta updates, a TT update, and a DD flag, are written to the MD delta log in association with a unique transaction identifier. As depicted in block 504, an MD stream for the MD pages containing bulk updates is generated. As depicted in block 506, the MD stream is passed to an MD pages tier of a tiered storage array. As depicted in block 508, in response to a predetermined event (e.g., high availability (HA) event, crash event), the MD delta log is replayed to apply valid delta updates to at least one MD page containing bulk updates in the MD pages tier, thereby recovering the MD pages tier to a consistent state.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:

during performance of a first transaction commit operation, by a storage node, to commit a first metadata (MD) page containing a first bulk MD update to storage in an MD pages tier of a RAID (Redundant Array of Independent Disks) storage array:

writing a first transaction commit entry to an MD delta log in association with a first unique transaction identifier (ID), wherein the first transaction commit entry includes, for the first MD page, a plurality of first raw delta updates, and a first logical-to-physical address translation table (TT) update;

providing the first MD page to an MD stream generator configured to:

store the first MD page with RAID stripe data of a RAID stripe of the RAID storage array; and in response to the RAID stripe data filling a storage capacity the RAID stripe, generate an MD stream including the RAID stripe data, the RAID stripe data including at least the first MD page containing the first bulk MD update;

passing, by the MD stream generator, the MD stream including the RAID stripe data to the MD pages tier of the RAID storage array, the first MD page included in the RAID stripe data being stored in the MD pages tier in accordance with the first logical-to-physical address TT update for the first MD page; and discarding, from among the plurality of first raw delta updates, one or more raw delta updates occurring before the first MD page was stored with the RAID stripe data in the MD pages tier, one or more valid delta updates remaining after the discarding of the one or more raw delta updates; and in response to a predetermined event, replaying the MD delta log to apply the one or more valid delta updates to the first MD page stored with the RAID stripe data in the MD pages tier, thereby recovering the MD pages tier to a consistent state.

2. The method of claim 1 wherein the writing to the MD delta log includes, for the first MD page containing the first bulk update, writing, to the MD delta log, the first bulk update to the first MD page, the first logical-to-physical address TT update for the first MD page, and a first specialized flag for the first MD page, in association with the first unique transaction ID, wherein the first specialized flag provides an indication that all delta updates to the first MD page that occurred prior to the first MD page being stored in the MD pages tier are to be dropped or discarded.

3. The method of claim 1 further comprising:

during the performance of the first transaction commit operation by the storage node:

acquiring a first exclusive lock for the first MD page containing the first bulk update.

4. The method of claim 3 further comprising:

synchronizing the plurality of first raw delta updates to the first MD page, the first specialized flag for the first MD page, and the first logical-to-physical address TT update for the first MD page, in association with the first unique transaction ID, in a volatile memory structure; and in response to the synchronizing of the plurality of first raw delta updates to the first MD page, the first specialized flag for the first MD page, and the first logical-to-physical address TT update for the first MD page, in the volatile memory structure, releasing the first exclusive lock for the first MD page containing the first bulk update.

5. The method of claim 1 further comprising:

during performance of a second transaction commit operation, by the storage node, to commit a second MD page containing a second bulk update to storage in the MD pages tier of the RAID storage array:

writing a second transaction commit entry to the MD delta log in association with a second unique transaction ID, wherein the second transaction commit entry includes, for the second MD page, a plurality of second raw delta updates, and a second logical-to-physical address TT update.

6. The method of claim 5 further comprising:

during the performance of the second transaction commit operation by the storage node:

acquiring a second exclusive lock for the second MD page containing the second bulk update.

7. The method of claim 6 further comprising:

synchronizing the plurality of second raw delta updates to the second MD page, a second specialized flag for the second MD page, and the second logical-to-physical address TT update for the second MD page, in association with the second unique transaction ID, in a volatile memory structure; and in response to the synchronizing of the plurality of second raw delta updates to the second MD page, the second specialized flag for the second MD page, and the second logical-to-physical address TT update for the second MD page, in the volatile memory structure, releasing the second exclusive lock for the second MD page containing the second bulk update.

8. The method of claim 5 wherein the providing of the first MD page to the MD stream generator includes providing the first MD page and the second MD page to the MD stream generator, storing the first MD page and the second MD page with the RAID stripe data of the RAID stripe of the RAID storage array, and, to generate-in response to the RAID stripe data filling the storage capacity the RAID stripe, generating the MD stream including the RAID stripe data, the RAID stripe data including the first MD page containing the first bulk update and the second MD page containing the second bulk update, wherein the passing of the MD stream to the MD pages tier includes passing, by the MD stream generator, the MD stream including the RAID stripe data to the MD pages tier of the RAID storage array, the first MD page and the second MD page included in the RAID stripe data being stored in the MD pages tier, and wherein the first MD page is stored in the MD pages tier in accordance with the first logical-to-physical address TT update for the first MD page, and the second MD page is stored in the MD pages tier in accordance with the second logical-to-physical address TT update for the second MD page.

9. The method of claim 8 wherein the writing to the MD delta log includes, for the second MD page containing the second bulk update, writing, to the MD delta log, the second bulk update to the second MD page, the second logical-to-physical address TT update for the second MD page, and a second specialized flag for the second MD page, in association with the second unique transaction ID, wherein the second specialized flag provides an indication that all delta updates to the second MD page that occurred prior to the second MD page being stored in the MD pages tier are to be dropped or discarded.

10. The method of claim 8 wherein the first MD page corresponds to a first version of a respective MD page, and the second MD page corresponds to a second version of the respective MD page, and wherein the replaying of the MD delta log includes replaying the MD delta log to apply the one or more valid delta updates to at least the first version of the respective MD page stored in the MD pages tier.

11. A system comprising:

a memory; and processing circuitry configured to execute program instructions out of the memory to:

during performance of a first transaction commit operation to commit a first metadata (MD) page containing a first bulk MD update to storage in an MD pages tier of a RAID (Redundant Array of Independent Disks) storage array:

write a first transaction commit entry to an MD delta log in association with a first unique transaction identifier (ID), wherein the first transaction commit entry includes, for the first MD page, a plurality of first raw delta updates, and a first logical-to-physical address translation table (TT) update;

provide the first MD page to an MD stream generator configured to:

store the first MD page with RAID stripe data of a RAID stripe of the RAID storage array; and in response to the RAID stripe data filling a storage capacity the RAID stripe, generate an MD stream including the RAID stripe data, the RAID stripe data including at least the first MD page containing the first bulk MD update;

pass, by the MD stream generator, the MD stream including the RAID stripe data to the MD pages tier of the RAID storage array, the first MD page included in the RAID stripe data being stored in the MD pages tier in accordance with the first logical-to-physical address TT update for the first MD page; and discard, from among the plurality of first raw delta updates, one or more raw delta updates occurring before the first MD page was stored with the RAID stripe data in the MD pages tier, one or more valid delta updates remaining after the discarding of the one or more raw delta updates; and in response to a predetermined event, replay the MD delta log to apply the one or more valid delta updates to the first MD page stored with the RAID stripe data in the MD pages tier, thereby recovering the MD pages tier to a consistent state.

12. The system of claim 11 wherein the processing circuitry is configured to execute the program instructions out of the memory, for the first MD page containing the first bulk update, to write, to the MD delta log, the first bulk update to the first MD page, the first logical-to-physical address TT update for the first MD page, and a first specialized flag for the first MD page, in association with the first unique transaction ID, wherein the first specialized flag provides an indication that all delta updates to the first MD page that occurred prior to the first MD page being stored in the MD pages tier are to be dropped or discarded.

13. The system of claim 11 wherein the processing circuitry is configured to execute the program instructions out of the memory to:

during the performance of the first transaction commit operation:

acquire a first exclusive lock for the first MD page containing the first bulk update.

14. The system of claim 13 wherein the processing circuitry is configured to execute the program instructions out of the memory to:

synchronize the plurality of first raw delta updates to the first MD page, the first specialized flag for the first MD page, and the first logical-to-physical address TT update for the first MD page, in association with the first unique transaction ID, in a volatile memory structure; and in response to synchronizing the plurality of first raw delta updates to the first MD page, the first specialized flag for the first MD page, and the first logical-to-physical address TT update for the first MD page, in the volatile memory structure, release the first exclusive lock for the first MD page containing the first bulk update.

15. The system of claim 11 wherein the processing circuitry is configured to execute the program instructions out of the memory to:

during performance of a second transaction commit operation to commit a second MD page containing a second bulk update to storage in the MD pages tier of the storage array:

write a second transaction commit entry to the MD delta log in association with a second unique transaction ID, wherein the second transaction commit entry includes, for the second MD page, a plurality of second raw delta updates, and a second logical-to-physical address TT update.

16. The system of claim 15 wherein the processing circuitry is configured to execute the program instructions out of the memory to:

during the performance of the second transaction commit operation:

acquire a second exclusive lock for the second MD page containing the second bulk update.

17. The system of claim 16 wherein the processing circuitry is configured to execute the program instructions out of the memory to:

synchronize the plurality of second raw delta updates to the second MD page, a second specialized flag for the second MD page, and the second logical-to-physical address TT update for the second MD page, in association with the second unique transaction ID, in a volatile memory structure; and in response to synchronizing the plurality of second raw delta updates to the second MD page, the second specialized flag for the second MD page, and the second logical-to-physical address TT update for the second MD page, in the volatile memory structure, release the second exclusive lock for the second MD page containing the second bulk update.

18. The system of claim 15 wherein the processing circuitry is configured to execute the program instructions out of the memory to:

provide the first MD page and the second MD page to the MD stream generator;

store the first MD page and the second MD page with the RAID stripe data of the RAID stripe of the RAID storage array;

in response to the RAID stripe data filling the storage capacity the RAID stripe, generate the MD stream including the RAID stripe data, the RAID stripe data including the first MD page containing the first bulk update and the second MD page containing the second bulk update; and pass, by the MD stream generator, the MD stream including the RAID stripe data to the MD pages tier of the RAID storage array, the first MD page and the second MD page included in the RAID stripe data being stored in the MD pages tier, wherein the first MD page is stored in the MD pages tier in accordance with the first logical-to-physical address TT update for the first MD page, and the second MD page is stored in the MD pages tier in accordance with the second logical-to-physical address TT update for the second MD page.

19. The system of claim 18 wherein the first MD page corresponds to a first version of a respective MD page, and the second MD page corresponds to a second version of the respective MD page, and wherein the processing circuitry is configured to execute the program instructions out of the memory to replay the MD delta log to apply the one or more valid delta updates to at least the first version of the respective MD page stored in the MD pages tier.

20. A computer program product including a set of non-transitory, computer-readable media having instructions that, when executed by processing circuitry of a storage node in a clustered system, cause the processing circuitry to perform a method comprising:

during performance of a first transaction commit operation, by the storage node, to commit a first metadata (MD) page containing a first bulk MD update to storage in an MD pages tier of a RAID (Redundant Array of Independent Disks) storage array:

writing a first transaction commit entry to an MD delta log in association with a first unique transaction identifier (ID), wherein the first transaction commit entry includes, for the first MD page, a plurality of first raw delta updates, and a first logical-to-physical address translation table (TT) update;

providing the first MD page to an MD stream generator configured to:

store the first MD page with RAID stripe data of a RAID stripe of the RAID storage array; and in response to the RAID stripe data filling a storage capacity the RAID stripe, generate an MD stream including the RAID stripe data, the RAID stripe data including at least the first MD page containing the first bulk MD update;

passing, by the MD stream generator, the MD stream including the RAID stripe data to the MD pages tier of the RAID storage array, the first MD page included in the RAID stripe data being stored in the MD pages tier in accordance with the first logical-to-physical address TT update for the first MD page; and discarding, from among the plurality of first raw delta updates, one or more raw delta updates occurring before the first MD page was stored with the RAID stripe data in the MD pages tier, one or more valid delta updates remaining after the discarding of the one or more raw delta updates; and in response to a predetermined event, replaying the MD delta log to apply the one or more valid delta updates to the first MD page stored with the RAID stripe data in the MD pages tier, thereby recovering the MD pages tier to a consistent state.

* * * * *